Feb. 1, 1955     H. L. OSBORNE     2,701,036
BRAKE MECHANISM
Filed Oct. 20, 1953
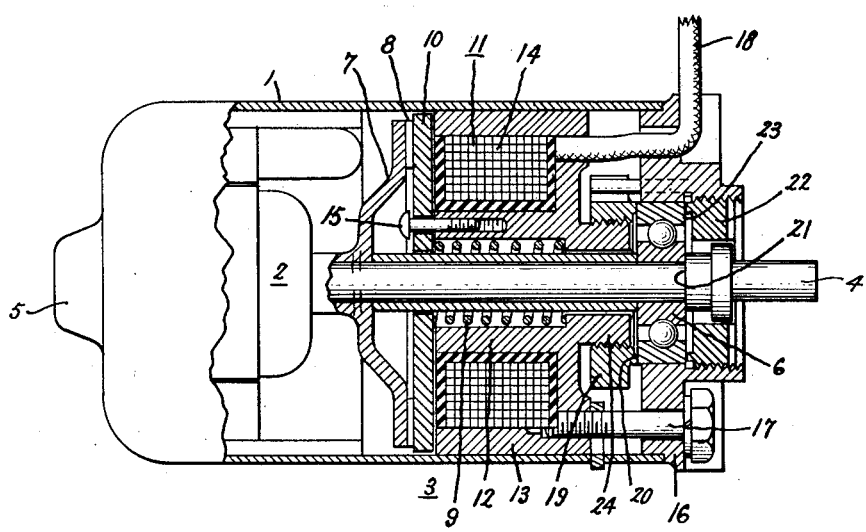
Inventor:
Herbert L. Osborne,
by *Robert G. Iris*
His Attorney.

United States Patent Office 2,701,036
Patented Feb. 1, 1955

2,701,036

BRAKE MECHANISM

Herbert L. Osborne, Fort Wayne, Ind., assignor to General Electric Company, a corporation of New York Application October 20, 1953, Serial No. 387,129

5 Claims. (Cl. 188—171)

This invention relates to electro-magnetic brake mechanisms and more particularly to an improved means of adjusting the air gap in such a device.

Electro-magnetic brake mechanisms are frequently associated with an electric motor to effect instant braking of the motor shaft and driven mechanism when the motor is de-energized. These mechanisms conventionally include an electro-magnet coil connected in series with the motor and an armature member cooperating with the coil and with a braking surface. In such a device, the coil is energized in response to energization of the motor and causes the armature to move away from the braking surface. When the motor is de-energized thus de-energizing the coil, means are provided to cause the armature to engage the braking surface thereby to provide instant stopping with the shaft. Electro-magnetic brake mechanisms of this type are used in many types of apparatus such as hoists, door actuators, etc.

In electro-magnetic type brakes, the size of the air gap between the axially movable armature and the stationary member of the electro-magnet unit determines the amount of energizing current necessary to operate the brake. It is, therefore, desirable that means be provided to adjust the air gap speedily and easily.

An object of this invention is, therefore, to provide an electro-magnetic brake mechanism wherein the air gap is readily adjustable.

Further objects and advantages of this invention will become apparent and the invention will be better understood by reference to the following description and the accompanying drawing; and the features of novelty which characterize this invention will be pointed out with particularity in the claims annexed to and forming a part of this specification.

This invention in its broadest aspects provides an electro-magnetic brake for braking the rotation of a shaft having a fixed electro-magnet unit and a sliding armature with means normally biasing the armature away from the electro-magnet unit to provide an air gap. The air gap is adjusted by providing a shoulder on the shaft with a shaft bearing abutting the shoulder. Axially adjustable means abut the bearing oppositely from the shoulder thus permitting axial adjustment of the shaft. A brake member is secured to the shaft and the armature is urged into engagement therewith by the biasing means when the electro-magnet unit is de-energized. When the electro-magnet is energized, it pulls the armature away from its braking engagement with the braking member. Movement of the adjustable means in a direction toward the bearing causes the bearing to push the shaft and the brake member to force the armature closer to the electro-magnet unit thereby lowering the air gap. Movement of the adjustable means in the other direction permits the biasing means to force the armature and brake member and the shaft in the other direction thereby to widen the air gap.

In the drawing, the single figure is a side view, partly cut away, of the improved brake mechanism of this invention in combination with a motor having a shaft to be braked.

Referring to the drawing, there is shown a casing 1 in which are located a motor 2 and a brake mechanism 3. A shaft 4 extends from the motor 2, and rotates in bearings 5 and 6. Secured to shaft 4 is a rotor member 7 which carries an annular brake shoe 8; a spring 9 biases disk-like armature member 10 toward brake shoe 8. Disk 10 acts both as a stationary braking member and as a working armature for brake 3 which has an electro-magnet unit 11 comprised of an annular inner pole 12 and an annular outer pole 13, carrying between them an annular insulated actuating winding 14. Disk 10 is slidingly keyed to electro-magnet unit 11 by means of a number of pins 15, only one of which is shown. Casing 1 has its open end closed by any suitable means such as end shield 16; magnet unit 11 being rigidly secured to end shield 16 by a plurality of studs 17, one of which is shown. It now becomes clear that, unless electro-magnet 11 is energized, spring 9 will bias disk 10 away from electro-magnet unit 11 and a gap will result between electro-magnet unit 11 and disk 10. Current is supplied to coil 14 through electrical connections 18.

A nut 19, threadedly engaged with hub portion 24 of electro-magnet unit 11, abuts bearing 6 along an annular surface 20. Bearing 6 in turn is adapted to bear against a shoulder 21 on shaft 4. An externally threaded member 22 is provided which is threadedly engaged with end shield 16 and abuts bearing 6 along an annular surface 23 directly opposite nut 19.

The operation of the air gap adjustment mechanism will now be described. First, it will be assumed that, for the purpose of explanation, it is desired to narrow the air gap, that is, to cause the face of electro-magnet unit 11 and armature disk 10 to be drawn closer together when electro-magnet unit 11 is not energized. It will be remembered that spring 9 biases armature disk 10 against brake shoe 8 of rotor member 7 which is attached to shaft 4. This means that an axial movement of member 7 will of necessity cause disk 10 to follow under the influence of spring 9. If nut 19 is now screwed in one direction, say counterclockwise, it will force movement of bearing 6 toward the right as viewed in the drawing; bearing 6, which is arranged to slide axially in end shield 16, will then force shaft 4 to move axially toward the right by pushing against shaft shoulder 21. When shaft 4 moves toward the right, it carries with it member 7 and, consequently, disk 10. Since electro-magnet unit 11 remains stationary, the air gap between electro-magnet unit 11 and disk 10 is decreased.

To increase the air gap it is merely necessary to turn nut 19 in the opposite direction, say clockwise. The push of bearing 6 on shoulder 21 will then be removed, and spring 9 will force disk 10 and, consequently, member 7 and shaft 4 into the casing until bearing 6 is again securely abutting against nut 19 at surface 20.

When a satisfactory air gap has been attained as described above, member 22 is then screwed into end shield 16 so that it abuts bearing 6 at surface 23. Bearing 6 is thus fixed between nut 19 and member 22 thereby preventing its rotation in end shield 16, and, therefore, the axial location of the shaft 4, and the air gap between disk 10 and electro-magnet unit 11, are set as desired. The shaft 4 with the rotor of motor 2 and rotor member 7 thereon, electro-magnet unit 11, and end shield 16 are then assembled in casing 1 in which the stator member of motor 2 has already been positioned.

It is clear from the above description that adjustment of the air gap is achieved in an easy rapid fashion without the necessity of using shims and that readjustment can be accomplished without the necessity for completely disassembling the mechanism.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In an electro-magnetic brake for braking the rotation of an axially movable and rotatable shaft, said brake having a fixed electro-magnet unit and a sliding armature with means normally biasing said armature away from said electro-magnet unit to provide an air gap therebetween, improved means for adjusting said air gap comprising a shoulder on said shaft, a bearing for said shaft abutting said shoulder, means adjustable axially of said electro-magnet unit and abutting said bearing oppositely from the abutment of said bearing and said shoulder, and a brake member secured to said shaft and abutting said armature when said electro-magnet unit is de-energized whereby movement of said adjustable means in a direction toward said bearing will cause said bearing to push said shaft and said brake member in that direction to force said armature closer to said electro-magnet unit thereby narrowing said air gap and movement of said adjustable means in the other direction will permit said biasing means to force said armature, said brake member and said shaft in said other direction thereby to widen said air gap.

2. In an electro-magnetic brake for braking the rotation of an axially movable and rotatable shaft, said brake having a fixed electro-magnet unit and a sliding armature with spring means normally biasing said armature away from said electro-magnet unit thereby to provide an air gap, improved means for adjusting said air gap comprising a shoulder on said shaft, a bearing on said shaft abutting said flange, a nut threadedly mounted on said electro-magnet unit and adjustable axially thereof, said nut abutting said bearing oppositely from the abutment of said bearing and said shoulder, and a brake member rigidly secured to said shaft and abutting said armature when said electro-magnet unit is de-energized, whereby movement of said nut in a direction axially toward said bearing will cause said bearing to push said shaft and said brake member in that direction to force said armature closer to said electro-magnet unit thereby narrowing said air gap, and movement of said nut in the other direction will permit said spring to force said armature, said brake member and said shaft and said member in said other direction to widen said air gap.

3. An electro-magnetic brake comprising an electromagnet unit and an armature movable relatively to said electro-magnet unit, means cooperable with said armature normally to bias said armature away from said electromagnet unit thereby to provide an air gap therebetween, a rotatable and axially movable shaft, a brake member secured to said shaft and abutting said armature oppositely from said electromagnet unit when said electromagnet unit is de-energized, a shoulder on said shaft, bearing means for said shaft abutting said shoulder, and means movably secured to said electromagnet unit adjustable axially thereof and abutting said bearing means oppositely from said shoulder whereby adjustment of said movable means in a direction toward said bearing means will cause said bearing means to push said shaft and brake member in that direction to force said armature closer to said electromagnet unit thereby narrowing said air gap, and movement of said movable means in the other direction will permit said biasing means to force said armature, said brake member and said shaft in said other direction to widen said air gap.

4. An electro-magnetic brake comprising an electromagnet unit and an armature movable relative to said electro-magnet unit, a casing enclosing said electromagnet unit and open at that side of said electro-magnet unit which is opposite to said armature, spring means cooperable with said armature to normally bias the same away from said electro-magnet unit to provide an air gap therebetween, a rotatable and axially movable shaft, a brake member secured to said shaft and abutting said armature oppositely from said electromagnet unit when said electromagnet unit is de-energized, a shoulder on said shaft, a bearing for said shaft abutting said shoulder, means movably secured to said electro-magnet unit adjustable axially thereof and abutting said bearing means oppositely from said shoulder whereby movement of said movable means in a direction toward said bearing will cause said bearing to push said shaft and said brake member in that direction to force said armature closer to said electromagnet unit thereby to narrow said air gap, and movement of said movable means in the other direction will permit said spring to force said armature, said brake member and said shaft in said other direction to widen said air gap, an end shield member secured to and substantially closing said casing at the open end thereof, said electromagnet unit being mounted on said end shield member, and an annular member movably secured within said end shield member and adjustable axially thereof, said annular member being arranged to abut said bearing on the side remote from said shoulder whereby tightening of said annular member against said bearing after either of said adjustments will maintain said bearing and consequently said shaft, said brake member and said air gap in their adjusted positions.

5. An electromagnetic brake comprising a rotatable and axially movable shaft, a fixed annular electromagnet unit surrounding said shaft, a disk shaped armature movable relative to said electromagnet unit and having an opening in its center through which said shaft extends, coil spring means surrounding said shaft abutting said electromagnet unit and said armature and biasing said armature away from said electromagnet unit to provide an air gap therebetween, a brake member secured to said shaft normally abutting said armature along an annular surface thereof and positioned oppositely of said electromagnet unit from said armature whereby said brake member limits the distance that said spring can bias said armature away from said electromagnet unit, a shoulder on said shaft, said shoulder being located oppositely from said brake member with respect to said electromagnet unit, a bearing supporting said shaft abutting said shaft shoulder and located between said shoulder and said electromagnet unit, a threaded section on said electromagnet unit, a nut threadedly engaging said threaded section of said electromagnet unit whereby rotation of said nut on said electromagnet unit will cause axial movement of said nut with respect to said electromagnet unit, said nut abutting said bearing whereby movement of said nut toward said bearing will cause said bearing to push said shaft and said brake member in that direction to force said armature closer to said electromagnet unit thereby narrowing said air gap, and movement of said nut away from said bearing will permit said spring to force said armature, said brake member, and said shaft in the other direction to widen said air gap, said electromagnet unit being mounted within a casing, an end shield member having secured to and substantially closing said casing at one end thereof and having at least part of its internal surface threaded, said electromagnet unit being secured to said end shield member, and an annular member in threaded engagement with said end shield member and abutting said bearing oppositely from said nut whereby tightening of said annular member against said bearing after said nut has been adjusted will maintain said bearing and consequently said shaft, said brake member and said air gap in their adjusted positions.

References Cited in the file of this patent
UNITED STATES PATENTS

| Number | Name | Date |
|---|---|---|
| 899,822 | Ast | Sept. 29, 1908 |
| 1,869,876 | Apple | Aug. 2, 1932 |
| 2,025,098 | Dudick | Dec. 24, 1935 |
| 2,059,028 | Price | Oct. 27, 1936 |
| 2,070,813 | Stearns et al. | Feb. 16, 1937 |
| 2,481,028 | Lear | Sept. 6, 1949 |
| 2,562,788 | Hodgson | July 31, 1951 |